July 22, 1958
D. E. GRISWOLD
2,844,167
PILOT VALVE CONSTRUCTION
Filed Sept. 17, 1954
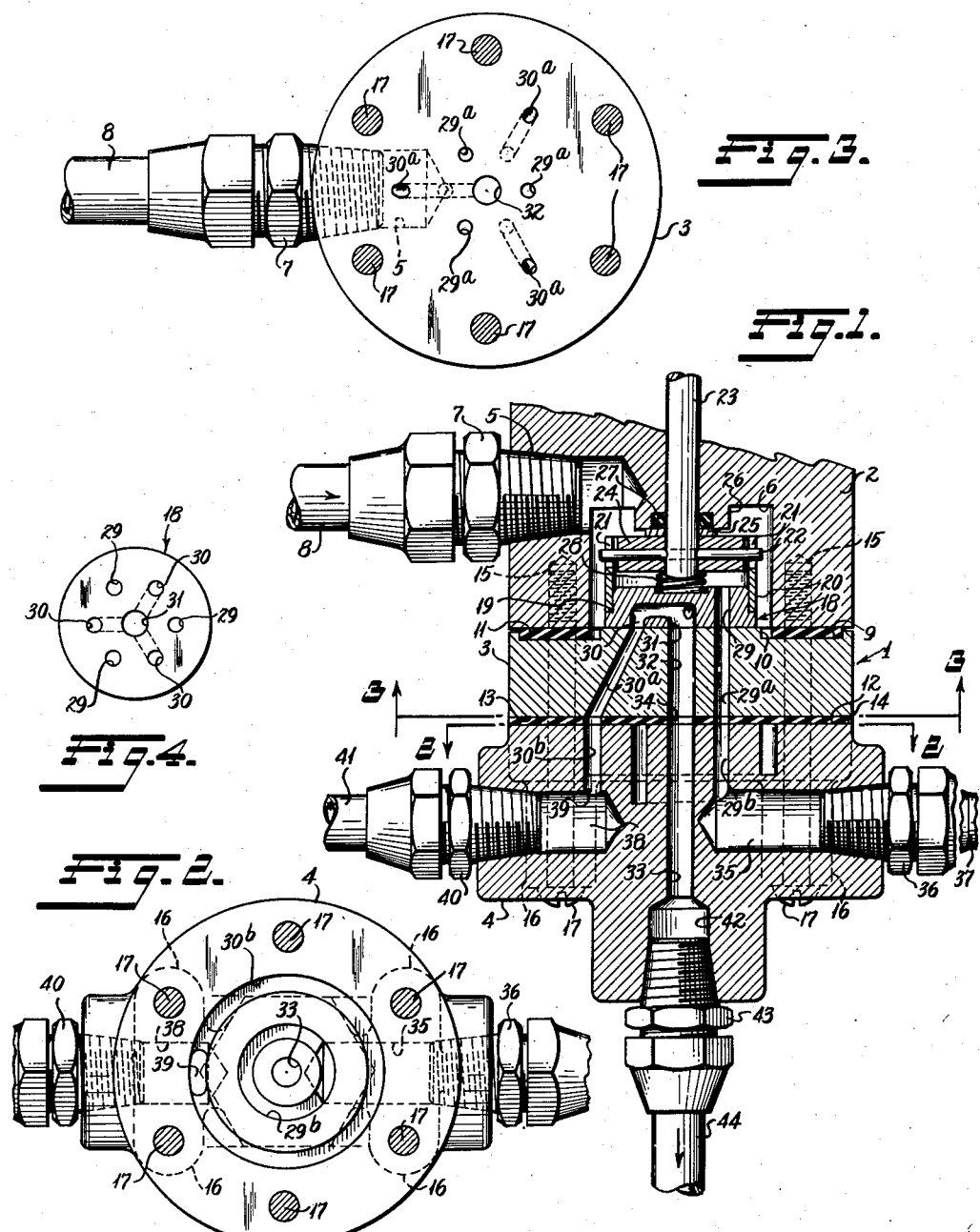
INVENTOR
DAVID E. GRISWOLD
BY
Bacon & Thomas
ATTORNEYS

2,844,167
PILOT VALVE CONSTRUCTION

David E. Griswold, San Marino, Calif., assignor to Donald G. Griswold, Alhambra, Calif.

Application September 17, 1954, Serial No. 456,772

10 Claims. (Cl. 137—624)

The present invention relates to a pilot valve of general utility adapted to control the supply and exhaust of operating fluid to various elements, such as a fluid pressure operable valve, a fluid-pressure operable cylinder and piston, etc.

More particularly, the invention relates to a pilot valve which is of small size but is constructed so that it has a flow capacity equivalent to that of a valve of much larger size.

The principal object of the invention is to provide a pilot valve constructed and arranged so as to provide for a large flow of operating fluid, thus assuring quick operation of the apparatus controlled thereby.

Another object is to provide a pilot valve including a fluid distributing member having a minimum number of ports arranged to provide for a large volume of flow of operating fluid.

A further object is to provide a pilot valve comprising few parts that can be readily manufactured and quickly assembled into a control unit for pneumatic or hydraulically operated apparatus.

Other objects and features of the invention will be apparent from the following description taken in conjunction with the accompanying drawings, in which:

Fig. 1 is a vertical sectional view taken through the center of the valve;

Fig. 2 is a sectional view taken along the line 2—2 of Fig. 1;

Fig. 3 is a sectional view taken along the line 3—3 of Fig. 1; and

Fig. 4 is a view of the lower face of the pilot disc.

Referring now in detail to the drawings, the pilot valve is generally identified by the number 1 and comprises three primary parts, namely: a body member 2, an intermediate member 3 and a fluid distribution base 4, all preferably made of corrosion resistant metal.

The body member 2 has an inlet 5 leading to a pressure chamber 6 for operating fluid under pressure. A conventional fitting 7 is mounted in the inlet 5 and connects a supply conduit 8 to the body 2.

The intermediate member 3 is disc-shaped and one face thereof has an annular recess 9 surrounding a raised seat 10. An annular gasket 11 is disposed in the recess 9 and forms a fluid tight seal between the body 2 and the intermediate member 3.

The base 4 is also generally circular and has a flat face 12 confronting a similar face 13 on the intermediate member 3, a circular gasket 14 forming a fluid tight seal between said faces. The body 2 has threaded openings 15 aligned with plain openings in the gasket 11, intermediate member 3, gasket 14 and lugs 16 on the base 4 to receive screws 17 which secure the aforementioned parts in assembled relation.

The pressure chamber 6 contains a pilot disc 18 shouldered at 19 to receive a tight-fitting cylindrical skirt 20 having notches 21 to receive the ends of a drive pin 22. The pin 22 is carried by a shaft 23 and extends through a drive member 24, which cooperates with the skirt 20 to maintain the pilot disc 18 concentric with the seat 10. A thrust washer 25 is disposed between the drive member 24 and a boss 26 in the pressure chamber 6. A conventional O-ring 27 forms a seal around the shaft 23 to prevent leakage of pressure fluid from the chamber 6. A small compression spring 28 between the drive member 24 and pilot disc 18 maintains said disc seated at all times. However, sufficient clearance exists between the skirt 20 and drive member 24 to enable self-alignment of the pilot-disc 18 with its seat 10.

The pilot disc 18 has three pressure ports 29, Fig. 4, extending vertically therethrough on radii spaced 120° apart and three U-shaped radial exhaust ports 30 having a common enlarged axial leg 31, also spaced 120° apart but lying mid-way between the through-ports 29.

The intermediate member 3 has an axial drain passage 32 aligned with exhaust port leg 31, and the base 4 has a drain passage 33 in registration with the passage 32, the gasket 14 having an opening 34 to permit communication between the passages 32 and 33. The member 3 also has a set of three passages 29a parallel with the passage 32 and another set of three passages 30a inclined diagonally, or downwardly and outwardly and with which the pilot disc ports 29 or 30 can be selectively placed in registration. The lower end of the passages 29a communicate through suitable openings in the gasket 14 with an annular groove 29b and lower end of the passages 30a communicate with a similar but less deep annular groove 30b. The grooves 29b and 30b are concentric with each other and with the axial passage 33.

The inner groove 29b is intersected by a radial bore 35 having a fitting 36 mounted therein and connected to one end of a conduit 37, the other end of which is connected to one side of the fluid pressure operated device (not shown) controlled by the pilot valve 1. A relatively shorter second radial bore 38 is connected with the outer groove 30b by a slot 39, Fig. 2. A fitting 40 is mounted in the outer end of the bore 38 and connects one end of a conduit 41 with the base 4, the other end of said conduit being connected with the other side of the device (not shown) controlled by the pilot valve 1. Finally, an axial bore 42 communicates with the passage 33 and a fitting 43 connects one end of a drain conduit 44 with the base 4.

The exhaust port leg 31 and the drain passages 32 and 33 are of relatively large size compared to the remaining pilot disc passages 29 and 30 and the passages 29a and 30a in the intermediate member 3 to facilitate the flow of either liquid or gaseous operating fluid therethrough.

In operation, with the pilot disc 18 positioned as shown in Fig. 1, the operating fluid under pressure is received at the inlet opening 5 and delivered to the pressure chamber 6 where it is communicated through the space between the periphery of drive member 24 and skirt 20, through the three pressure passages 29 in the pilot disc 18, through the set of passages 29a in the member 3 and into the inner groove 29b in base 4. From this groove the pressure fluid is communicated through bore 35 and conduit 37 to whatever device (not shown) is intended to be operated thereby. Simultaneously, the exhaust ports 30 of the pilot disc 18 are in registration with the set of passages 30a in the member 3, thereby establishing communication between conduits 41 and 44. Thus, spent operating fluid is exhausted from the device (not shown) controlled by the pilot valve 1 through conduit 41, bore 38, slot 39, channel 30b in the base 4, passage 30a in the member 3, exhaust ports 30 in the pilot disc 18, then through passages 32, 33 and bore 42 for ultimate discharge through the drain conduit 44.

It will be readily understood that when the shaft 23 is rotated by any suitable manual, mechanical or electrical means (not shown) through an angle of 60°, the pilot disc 18 will be rotated correspondingly with respect to its seat 10. As a result, the three pressure ports 29 of the pilot disc 18 will now assume a position in communication with the three inclined passages 30a of the member 3; and, simultaneously, the three exhaust ports 30 in said pilot disc register with the vertical passages 29a in said member. Consequently, the direction of flow of operating fluid will be reversed from that described above. In other words, conduit 37 will now be connected to exhaust through drain conduit 44, and conduit 41 will be subject to pressure. Thus, the chambers of whatever device is controlled by the pilot valve 1 will be alternately subject to pressure and exhaust.

It will thus be seen that a pilot valve has been provided whereby a substantially great volume of fluid under pressure can be supplied to control a given device by a relatively small valve control unit, thus assuring a maximum of speed in the operation of such device. This result is accomplished primarily through the employment of the multiple passages 29a and 30a and the concentric grooves 29b and 30b, which allow the flow of a maximum amount of fluid between the pilot disc ports and the bores 35 and 38 associated with the conduits 37 and 41, respectively.

It will be understood that various modifications in construction and in the arrangement of the elements in the present pilot valve may be made without departing from the principles of the invention or the scope of the appended claims.

I claim:

1. A valve, comprising: a body having a chamber for operating fluid under pressure; means for conducting operating fluid to said chamber; housing means forming one wall of said chamber and having two sets of passages; a rotatable member in said chamber provided with ports for selectively admitting said operating fluid into said sets of passages, said housing means having two annular grooves having their upper extremities disposed in a common horizontal plane, each of said grooves being aligned with and communicating with a different one of said sets of passages, said housing means also having openings to communicate said operating fluid from said grooves to separate sources of use.

2. A valve, comprising: a housing having a chamber for operating fluid under pressure; means for conducting operating fluid to said chamber; an intermediate member having one side forming one wall of said chamber and having two sets of passages extending therethrough from said one side to the opposite side thereof; a rotatable member in said chamber provided with ports for selectively admitting said operating fluid into said sets of passages; and a fluid distributing member positioned on said opposite side of said intermediate member and having one face thereof confronting said opposite side, said fluid distributing member having two annular grooves in said one face thereof, each groove adapted to receive operating fluid from a different one of said sets of passages, said fluid distributing member having openings to communicate said operating fluid from said grooves to separate sources of use.

3. A valve as defined in claim 2, in which the grooves are of different depths and wherein one of said openings extends beneath the shallower groove and intersects with the deeper groove.

4. A valve as defined in claim 2, in which at least one of said grooves is connected to one of said openings by means of a passage therebetween.

5. A valve as defined in claim 2, in which the grooves are concentric and wherein the inner groove is deeper than the outer groove.

6. A pilot valve, comprising: a housing having a chamber for operating fluid under pressure; means for conducting operating fluid to said chamber; an intermediate member having one side forming one wall of said chamber and having a central exhaust passage and two sets of passages extending therethrough from said one side to the opposite side thereof, said passages being radially spaced from said central passage; a rotatable member in said chamber provided with ports for selectively admitting said operating fluid into one of said sets of passages while exhausting operating fluid from the other of said sets of passages; and a fluid distributing member positioned on said opposite side of said intermediate member and having one face thereof confronting said opposite side, said fluid distributing member having two annular grooves in said one face thereof, each adapted to receive operating fluid from a different one of said sets of passages, said fluid distributing member having openings to communicate said operating fluid from said grooves to separate sources of use.

7. A pilot valve, comprising: a housing having a chamber for operating fluid under pressure; means for conducting operating fluid to said chamber; an intermediate member forming one wall of said chamber and having two sets of passages, one set of passages extending perpendicularly through said intermediate member and the other set of passages extending diagonally through said intermediate member; a rotatable disc in said chamber provided with ports for selectively admitting said operating fluid into either of said sets of passages; and a fluid distributing member positioned on the opposite side of said intermediate member and having two concentric grooves in one face thereof, the outer of said grooves being adapted to receive operating fluid from said set of passages extending diagonally through said intermediate member, the inner of said grooves being adapted to receive operating fluid from said set of passages extending perpendicularly through said intermediate member, said fluid distributing member having openings to communicate said operating fluid from said grooves to separate sources of use.

8. A pilot valve, comprising: a housing having a chamber for operating fluid under pressure; means in said housing for conducting operating fluid to said chamber; an intermediate member having one side forming one wall of said chamber and having two sets of passages therein; a rotatable element in said chamber provided with pressure and exhaust ports for selectively admitting said operating fluid into one of said sets of passages while exhausting operating fluid from the other of said sets of passages; and a fluid distributing member positioned on the opposite side of said intermediate member, whereby said fluid distributing member and said intermediate member have faces confronting each other, one of said faces having two concentric grooves formed therein, each groove being adapted to receive operating fluid from a different one of said sets of passages, said fluid distributing member having a separate opening communicating with each of said grooves, and said members having aligned passage means communicating with the exhaust ports of said rotatable element for exhausting spent operating fluid.

9. A pilot valve comprising: a body having a chamber for operating fluid under pressure; means for conducting operating fluid to said chamber; an intermediate member having one side forming one wall of said chamber and having two sets of passages, one of said sets of passages extending substantially perpendicularly through said intermediate member and the other of said sets of passages extending diagonally through said intermediate member; a rotatable member in said chamber provided with pressure and exhaust ports for selectively admitting said operating fluid into one of said sets of passages while exhausting spent operating fluid from the other of said sets of passages, a fluid distributing member positioned on the opposite side of said intermediate member and having two concentric grooves in one face thereof, the outer of said concentric grooves being adapted to receive operating fluid from said set of passages extending diagonally through said intermediate member and the inner of said concentric grooves being adapted to receive operating fluid from said set of passages extending substantially perpendicularly through said intermediate member, said fluid distributing member having openings to communicate said operating fluid from said grooves to separate sources of use, said intermediate and fluid distributing members having aligned drain passages in constant communication with the exhaust ports of said rotatable member.

10. A pilot valve, comprising: a body having a chamber for operating fluid under pressure; means for conducting operating fluid to said chamber; an intermediate member having one side forming one wall of said chamber and having two sets of passages, one of said sets of passages extending substantially perpendicularly through said intermediate member and the other of said sets of passages extending diagonally through said intermediate member; a rotatable member in said chamber provided with pressure and exhaust ports for selectively admitting said operating fluid into one of said sets of passages while exhausting spent operating fluid from the other of said sets of passages; a fluid distributing member positioned on the opposite side of said intermediate member and having two concentric grooves of different depth in one face thereof, the outer of said concentric grooves being adapted to receive operating fluid from said set of passages extending diagonally through said intermediate member and the inner of said concentric grooves being adapted to receive operating fluid from said set of passages extending substantially perpendicularly through said intermediate member, one of said concentric grooves being intersected by an opening projecting inwardly from the outer peripheral surface of said fluid distributing member and the other of said grooves communicating with a similar opening in said fluid distributing member, said openings being disposed in substantially the same plane, said intermediate and fluid distributing members also having aligned drain passages in constant communication with the exhaust ports of said rotatable member.

References Cited in the file of this patent

UNITED STATES PATENTS

| | | |
|---|---|---|
| 916,262 | Brocke | Mar. 23, 1909 |
| 1,803,957 | Bragg | May 5, 1931 |
| 2,148,561 | Kempton | Feb. 28, 1939 |
| 2,564,529 | Griswold | Aug. 14, 1951 |